Sept. 5, 1972     L. W. EVANS ET AL     3,689,265

METHOD OF FORMING A COLOR CATHODE RAY TUBE SCREEN

Original Filed Feb. 2, 1970     3 Sheets-Sheet 1

INVENTORS.
LYLE W. EVANS &
WALTER W. SLOBBE

BY Donald R. Castle
                  ATTORNEY

United States Patent Office

3,689,265
Patented Sept. 5, 1972

3,689,265
METHOD OF FORMING A COLOR CATHODE RAY TUBE SCREEN
Lyle W. Evans, Geneva, and Walter W. Slobbe, Seneca Falls, N.Y., assignors to Sylvania Electric Products Inc.
Application Feb. 2, 1970, Ser. No. 7,449, which is a continuation-in-part of application Ser. No. 822,794, Apr. 2, 1969. Divided and this application June 7, 1971, Ser. No. 150,518
Int. Cl. G03c 5/00
U.S. Cl. 96—36.1        3 Claims

ABSTRACT OF THE DISCLOSURE

Method of forming a tri-color patterned screen for a color cathode ray tube comprising a combination of phosphors that provide a display of improved brightness. The method utilizes a red-emitting phosphor, a blue-emitting phosphor, and a green-emitting phosphor silver activated zinc-cadmium sulfide material exhibiting no appreciable shift in hue or change in body color resultant of tube processing. The improved screen is backed by a substantially taut aluminizing film.

CROSS-REFERENCES TO RELATED APPLICATIONS

This application is a divisional application of S.N. 7,449 filed Feb. 2, 1970 which is a continuation-in-part of S.N. 822,794 filed Apr. 2, 1969 and assigned ot the assignee of the present invention. This divisional application contains matter disclosed but not claimed in another application, S.N. 150,519, now abandoned Attorney's Docket D–6468, filed concurrently herewith, which application is also a division of S.N. 7,449.

BACKGROUND OF THE INVENTION

This invention relates to cathodoluminescent screens and more particularly to a method of forming an improved color cathode ray tube screen.

The conventional types of cathode ray tubes generally utilized in color television applications employ internal means for forming and directing at least one electron beam to impinge a patterned cathodoluminescent screen in accordance with signals supplied thereto. A patterned screen of this nature is usually comprised of a plurality of phosphor groupings disposed as related stripes, bars, or dots which are individually responsive to electron excitation, usually beamed from separate electron guns to provide luminescent hues of red, green and blue respectively.

To form an efficient tri-color cathodoluminescent screen in a cathode ray tube for television usage, the three respective color phosphor components of the screen combination are carefully selected with particular reference to definitive color characteristics, such as hue, degree of saturation, and inherent brightness. Consideration of these characteristics is very important as a blend of all three hues should provide a balanced white of a desired color temperature when all three phosphors are simultaneously excited.

The desired white is a relative value of a balanced "white" which can be represented on a conventional C.I.E. (Commission International d'Eclairage) chromaticity diagram. One such white, conventionally designated as Standard Illuminant C, is defined by the intersection of $x$ and $y$ coordinates 0.310 and 0.316 respectively. Another white, presently utilized in many color television applications, has a somewhat lower $x$ value being indicated as a 9300° Kelvin temperature white which can be C.I.E. defined by an $x$ value of 0.281 and a $y$ value of 0.311. In similar manner other values of relative white may be designated in view of requirements. In this specification, a white temperature value of 9300° K. will be considered representative for color television utilization.

In choosing the proper luminescent relationship of the red, green and blue additive primaries of a screen combination to produce the desired white, the several color-emitting phosphor materials are carefully selected for their compatible contributory color qualities. Unfortunately, some of the prosphors, that exhibit hue and saturation compatibilities as screen components for producing the desired white, have unequal brightness efficiencies due to their chemical compositions. There have been times when an intentional adjustment or reduction in the luminescence of one or more of the brighter phosphors has been made to achieve a brightness compatible with that evidence from the lesser efficient phosphor or phosphors in the particular screen combination. Such a compromising procedure reduces the level of overall screen brightness. Other means of adjusting the imbalance of phosphor brightness performance is accomplished by regulating the intensities of the respective impinging electron beams to provide the proper degree of brightness from each phosphor in the combination. Thus, the less efficient color-emitting phosphors require electron beam currents of significantly higher values than those necessary for exciting the brighter phosphor components of the screen combination. The differences of operating intensities of the several electron guns, functioning simultaneously to provide the desired white, are conventionally designated in terms of at least two gun current ratios; as, red to green ($R/G$) and red to blue ($R/B$). For instance, when the three guns are operating simultaneously to provide the desired white, a $R/G$ gun ratio of 0.9:1 indicates that an electron beam current of ten percent less intensity is required from the red gun than is needed from the green gun to provide the necessary individual brightness responses from the respective red and green emitting phosphors. Similarly, a $R/B$ gun ratio of 1.4:1 signifies that the red gun must deliver forty percent more beam current than the blue gun to satisfactorily complete the white field in the simultaneously excited screen.

Inherent body color, which relates to the degree of translucency or opacity of the particular color-emitting phosphor crystal, is an important characteristic of cathodoluminescent phosphors. Those phosphors that are substantially translucent are conventionally classed as having white body color which enhances the transmission of light therethrough. With the use of rare earth phosphors, especially red-emitting materials that exhibit increased brightness over previously used phosphors, there has been an improvement in white screen brightness. For example, the utilization of a red-emitting rare earth component such as europium activated yttrium vanadate, used in combination with a compatible green-emitting component such as silver activated zinc-cadmium sulfide, and a compatible blue-emitting component such as silver activated zinc sulfide having brightness inhibiting additives, produced a color tube screen exhibiting increased brightness over the conventional screens prior thereto. However, it has been found that both the hue of the emitted light and the body color of the silver activated green-emitting zinc-cadmium sulfide phosphor tend to shift as a result of the temperature range encountered during tube processing. Such variables are detracting factors in the quality of imagery emanating from the respective screen combination. While the aforedescribed screen is an improvement over former screen combinations, there is further need to increase both the brightness and hue characteristics of color tube imagery to enhance the quality of color presentation under high ambient light conditions.

OBJECTS AND SUMMARY OF THE INVENTION

It is an object of the invention to reduce the aforementioned disadvantages and to provide a method of forming an improved color cathode ray tube having an improved cathodoluminescent screen therein.

A further object is to provide a method of forming a color cathode ray tube screen having improved brightness and hue characteristics.

An additional object is to provide a method of forming a color cathode ray screen comprising a combination of compatible color-emitting phosphors to effect a display of improved white brightness.

The foregoing objects are achieved in one aspect of the invention by the provision of a method of producing a color cathode ray tube having means therein for providing and directing a plurality of electron beams to impinge a tri-color cathodoluminescent screen comprising red, green and blue electron-responsive light-emitting phosphor components. The green-emitting phosphor component is a silver activated zinc cadmium sulfide material exhibiting no appreciable shift in hue or body color as a result of the temperatures encountered during tube processing.

The three color-emitting phosphors are selectively combined to form a three component system to provide a patterned screen which is treated with an oxygen containing compound to provide markedly improved brightness, color purity and resolution.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

Figure 1:
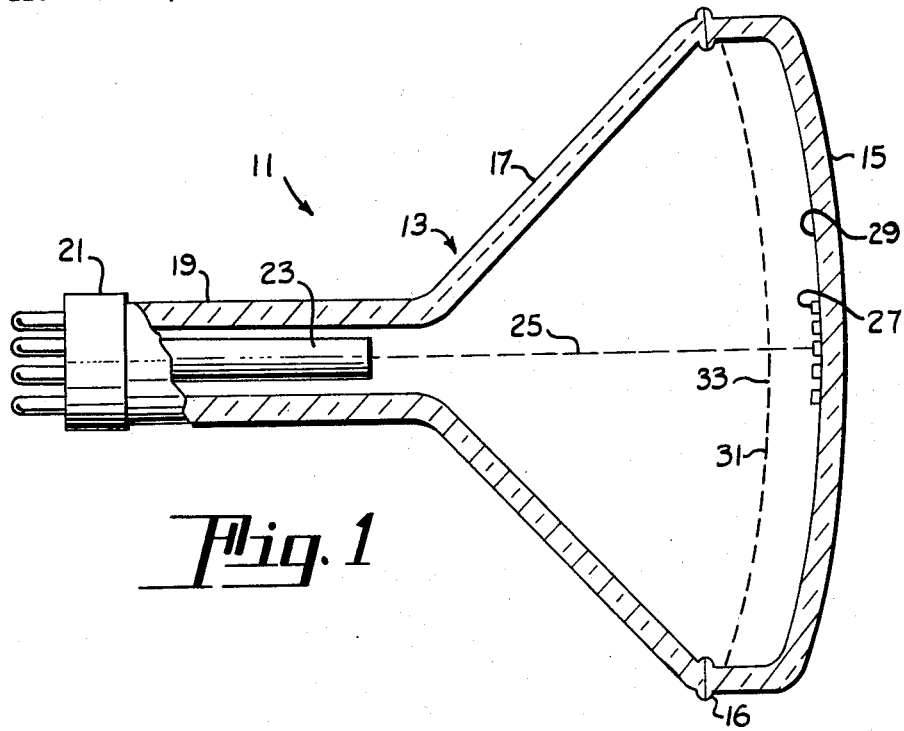
FIG. 1 is a cross-sectional view of a typical color cathode ray tube illustrating basic features thereof.

With reference to the drawings, there is shown in FIG. 1 a color cathode ray tube 11 of a type conventionally utilized in television applications. The tube comprises an evacuated envelope 13 having a viewing panel portion 15, a funnel portion 17, and a restricting neck portion 19. Attached to the terminal end of the neck portion is a base 21 which has conductive means therethrough for connecting the tube electrodes with their associated receiver circuitry. Within the neck portion there is mounted an electron generating means 23 in the form of one or more electron guns from which emanate one or more electron beams 25 utilized in the operation of the tube. A cathodoluminescent screen 27 comprising a pattern of color-emitting phosphors is formed on the interior surface 29 of the light transmission viewing panel 15. Within the envelope, a mask or grid electrode 31 having a plurality of apertures 33 therein, is positioned adjacent the screen 27. In the tube type shown in FIG. 1, the electrode 31 may be utilized primarily to either focus or deflect the electron beam 25, or to mask, or to mask and focus the beam to effect the desired electron impingement upon the patterned screen 27. The specific grid electrode and screen structures and the potentials applied thereto will determine the specific type of operation in a manner known to the art.

Figure 2:
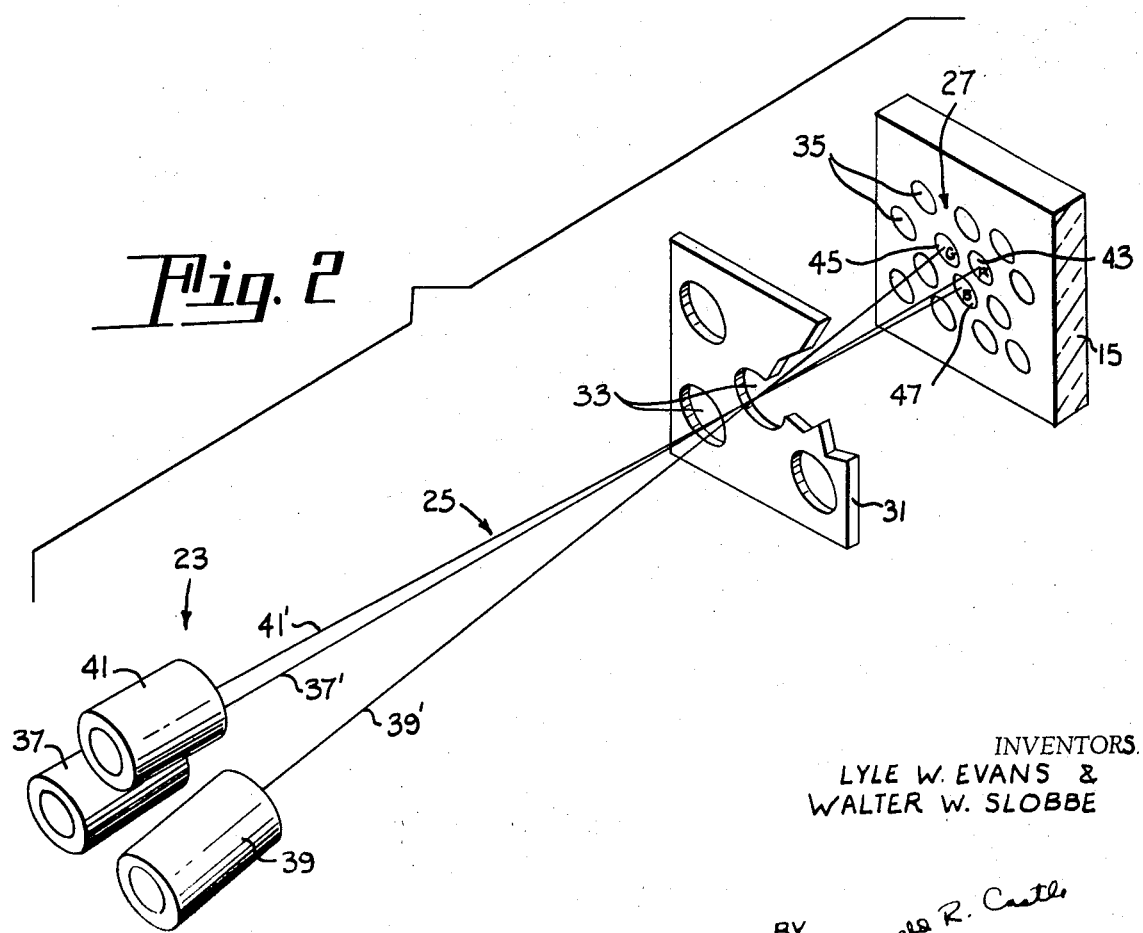
FIG. 2 is an enlarged partial perspective portraying a portion of a color cathode ray tube embodying a discretely patterned phosphor screen.
Figure 3:
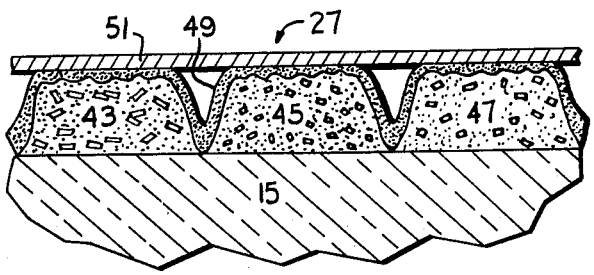
FIG. 3 is an enlarged partial sectional illustrating components of the screen structure.

With particular reference to FIGS. 2 and 3, there is shown in enlarged detail the principles of a specific form of cathode ray tube having a screen and grid electrode structure as employed in a tri-gun shadow mask tube. In this instance, the cathodoluminescent screen 27 comprises a pattern of tri-color phosphor groups in the form of a multitude of red, green and blue color-emitting phosphor dots. The electron generating means 23 comprising three electron guns are positioned substantially equidistantly from one another in a manner to provide static convergence of the respective electron beams at the central mask opening. For example, the three electron guns 37, 39 and 41 individually emit a beam of electrons 37', 39' and 41' respectively, which are directed to converge at an aperture 33 in the mask 31. Thereat they cross one another and proceed to impinge upon a triad of related red, green and blue color-emitting phosphor dots, 43, 45 and 47 respectively, which are part of the screen pattern disposed on the light transmissive viewing panel 15. As will be subsequently described, the electron beam currents of these individual guns are adjusted in accordance with the brightness efficiencies of the several color-emitting phosphors which compatibly comprise the discrete combination utilized in the specific screen pattern.

To achieve a color screen having improved hue and brightness characteristics requires much more than a mere substitution of phosphors. In order to establish the compatible parameters of the additive primaries of a tri-color phosphor combination, extensive creativity is required because of the interaction between the color components. Such will be clearly evident in describing one embodiment of the present invention which comprises: a red-emitting white-body europium activated rare earth oxide phosphor having particles of increased luminance brightness under electron excitation, a green-emitting silver activated zinc sulfide-cadmium sulfide phosphor which is processed during tube making to have a characteristic body color approaching that of the pre-tube-processing state which is contributory to improved luminance brightness under electron excitation, and a blue-emitting silver activated zinc sulfide composition exhibiting improved brightness having therein minor inclusions of elements selected from groups 1a and 2a of the periodic system along with a minor amount of aluminum.

Figure 4:
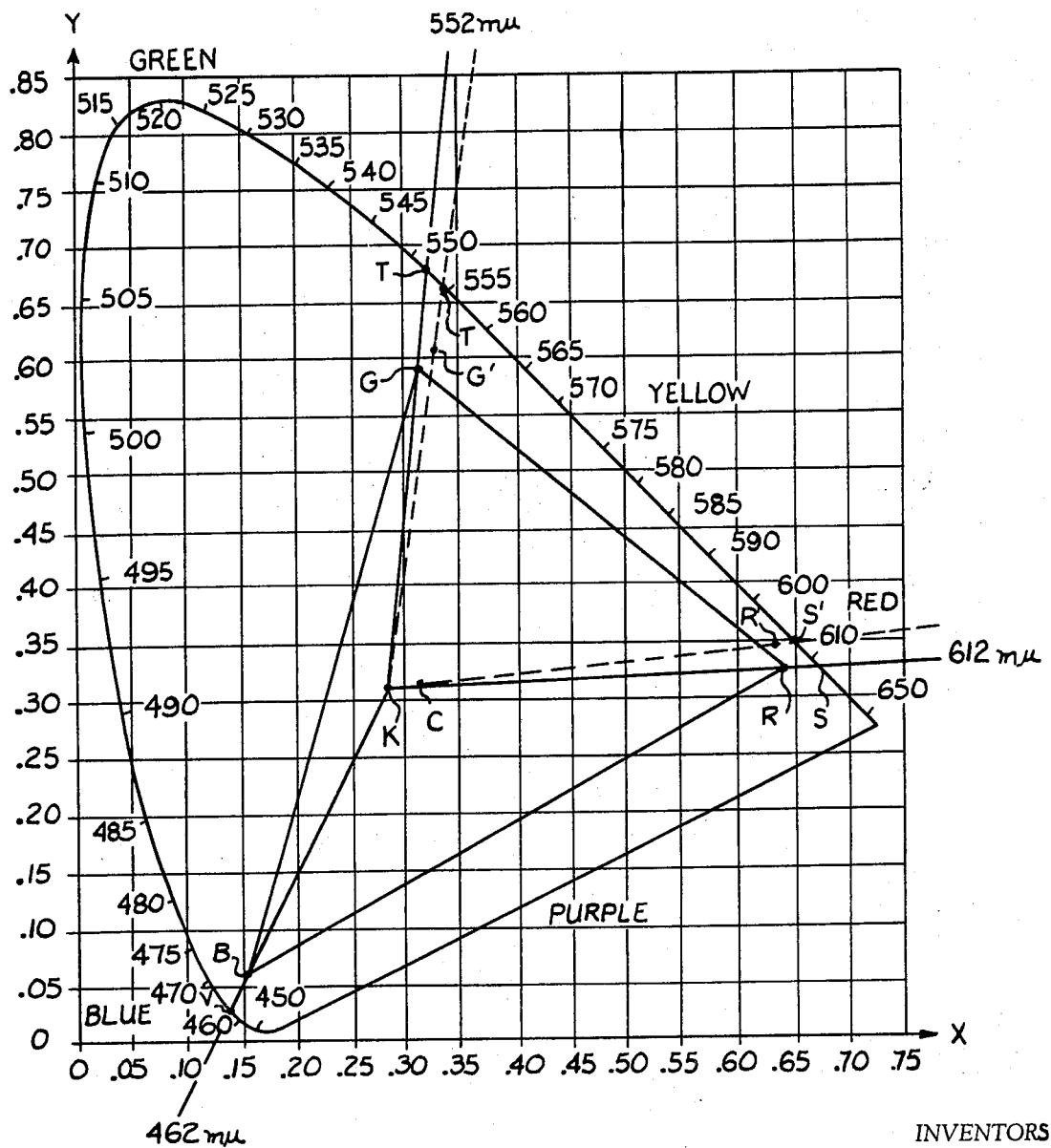
FIG. 4 shows a standard C.I.E. chromaticity diagram with the color coordinates of the new tri-color screening system denoted thereon.

To specifically describe a first embodiment of the tri-color phosphor combination of the invention, reference is directed to FIG. 4 wherein there is shown a standard C.I.E. chromaticity diagram having color definitive $x$ and $y$ coordinates whereby hue and degree of color saturation may be designated. The periphery of the horseshoe-shaped figure defines a monochromatic locus of which the blue and red ends of the spectrum are spanned by a line forming a locus of pure purple. Encompassed within the loci of the chromaticity diagram is a range of colors to which the normal human eye is sensitive. A sequential series of numbers, noted adjacent to the loci, indicate pure spectral wavelengths in millimicrons (m$\mu$). Thus, the hue of any color may be defined in terms of $x$ and $y$ coordinates. Due to the inherent capabilities of measuring instruments, the $x$ and $y$ values cited in this specification are substantially within a range of ±0.004 unit. As mentioned earlier, white is a relative value of the combined additive primary color components. The 9300° K. temperature white, as considered representative in this specification, is designated by the letter K with $x$ and $y$ values of 0.281 and 0.311 respectively. A color cathode ray tube, utilized in television applications, should evidence primary colors which approach those required by the color transmission system employed. While a certain spectral range is allowable for each of the additive primary hues, endeavor is made to define each of the three primary colors to form vertices of a triangle within the C.I.E. diagram enclosing a gamut of hues to provide a full range of color rendition.

By way of illustrating one embodiment of the tri-color phosphor combination of the present invention exhibiting improved brightness will be described in detail. The red-emitting phosphor component of the invention is a europium-activated rare earth oxide material having parallelepipedonal particles being selected from the group of white body phosphors consisting essentially of gadolinium oxide, yttrium oxide and mixed gadolinium-yttrium oxide, such being expressed in molar values by the empirical formula:

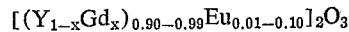

$$[(Y_{1-x}Gd_x)_{0.90-0.99}Eu_{0.01-0.10}]_2O_3$$

wherein $x$ is from 0 to 1.

The term "parallelepipedonal" describes the well-defined shapes of these new phosphor particles in terms relating to their geometric external surfaces and has no particular relationship to the internal crystal structure of the particle. The yttrium oxide phosphor particles of the present invention are essentially cubical, having six substantially square-like faces, while some of he mixed crystal gadolinium-yttrium oxide particles are found to have a parallelepiped structure wherein at least four of the faces are more rectangular in shape.

A specific example of a red-emitting rare earth oxide having parallelepipedonal particles is defined as:

$$(Y_{0.940-0.990}Eu_{0.01-0.06})_2O_3$$

which has C.I.E. color coordinates in the finished screen defined by an $x$ value of substantially 0.644 and a $y$ value of substantially 0.330. A straight line K-R-S delineated from K, the 9300° Kelvin white, through the $x$ and $y$ coordinates, which designate R intersects the monochromatic locus at point S, to denote a dominant wavelength of substantially 612 m$\mu$. The respective hue is substantially 94 percent saturated. This parallelepipedonal phosphor is synthesized by a new process to have uniformity of shape and larger particle size, and as a result manifests improved electron excited luminance brightness over the known available yttrium oxide phosphor material which is an agglomerate of irregularly shaped finely divided particles embracing a wide range of sizes. Since the parallelepipedonal rare earth oxide material is of larger and more uniform particle size, it can accommodate an increased europium content at brightness levels equal to the earlier low europium activated oxides without loss in brightness, therefore the new phosphor is more red in hue when compared with the regular agglomerate material which has $x$ and $y$ coordinates of substantially 0.628 and 0.347 respectively, being designated by R' on the line K-R'-S' in FIG. 4. The parallelepipedonal material approaches the hue characteristics of the aforementioned yttrium vanadate material and is advantageously brighter than the latter phosphor.

The red-emitting parallelepipedonal particle phosphors can be prepared, for example, by forming an appropriate rare earth oxalate generally by precipitating the oxalate from an acidic aqueous solution containing the appropriate rare earth source material, separating the rare earth oxalate as a solid, washing the solid rare earth oxalate with an aqueous solution of oxalic acid, and thereafter heat treating to convert the rare earth oxalate to a rare earth oxide phosphor.

The complete process for synthesizing the above-noted red-emitting rare earth parallelepipedonal particle phosphors is the subject matter of a separate patent application, S.N. 812,913 filed concurrently with application Ser. No. 822,794 on Apr. 2, 1969. Subject method has been found to have broad application for increasing and controlling the particle size of rare earth oxides in general.

Additionally, the unique particle shapes of some of the new rare earth oxide phosphors enables the phosphors to have wider utilization than disclosed in the foregoing co-pending application. Consequently, the phosphor compositions, per se, form the subject matter treated in a separate patent application, Ser. No. 812,825 also filed concurrently with application Ser. No. 822,794 on Apr. 2, 1969.

The blue-emitting phosphor commonly used in color cathode ray tubes is silver activated zinc sulfide. When used in conjunction with the europium activated vanadate red-emitting phosphor, it is often necessary to repress or inhibit the brightness of the blue-emitting material to maintain the proper gun ratios. It has been found that a much brighter blue-emitting phosphor is advantageous in the tri-color combination wherein the aforedescribed red-emitting europium activated rare earth oxide parallelepipedonal particle phosphors are utilized. Further experimentation has shown that a luminance brightness greater than that afforded by regular silver activated zinc sulfide, free of brightness inhibitors, is desirable in the new phosphor combination. Consequently, additional endeavors in the quest for increased excited brightness have resulted in the use of a new white-body blue-emitting silver activated zinc sulfide phosphor composition comprising minor inclusions of elements selected from groups 1a and 2a of the periodic system along with a minor amount of aluminum. The total amount of the several inclusions is less than about five percent by weight based upon the total amount of silver activated zinc sulfide present. More specifically, the minor inclusions comprise the following elements expressed in percent by weight: from 0.01 to 0.10 of an alkaline earth metal selected from the group consisting essentially of barium, magnesium, and calcium; from 0.01 to 0.10 of an alkaline metal selected from the group consisting essentially of sodium, potassium, and lithium; and from 0.01 to 1.00 of aluminum. The above zinc sulfide composition is activated by 0.02 to 0.05 weight percent of silver. This new blue-emitting phosphor composition is synthesized by subjecting the zinc sulfide material to a series of special fluxes involving the inclusion elements. In general, these elements will be incorporated with the zinc sulfide prior to firing to produce the new phosphor composition. It is found that, under electron excitation, this new phosphor exhibits from twenty-five to fifty percent increased luminance over the standard silver activated zinc sulfide phosphor of substantially similar hue and can be used without brightness inhibitors at the maximum brightness level obtainable, as will be subsequently explained. By way of example, the new blue-emitting zinc sulfide phosphor material which is denoted at B in FIG. 4 comprises minor inclusions of magnesium, sodium and aluminum. This phosphor composition produces $x$ and $y$ color coordinates of substantially 0.152 and 0.068 respectively. A straight line K-B-V drawn from K through the $x$ and $y$ coordinates of B intersects the monochromatic locus at V to designate a dominant wavelength of substantially 462 m$\mu$. The blue hue of the improved phosphor is substantially 87 percent saturated.

In choosing the green-emitting component of the improved phosphor combination, several related factors must be taken into consideration. The excited phosphor should exhibit a luminescence of hue and a level of brightness compatible with the other cooperating phosphors in the combination. As a result of extensive optical evaluations of color tubes employing green-emitting phosphors exhibiting variations in chromaticity, it was determined that a certain amount of desaturation of the green chromaticity can be accommodated without materially degrading the performance of the color tube display. It was further discovered that when the hue of the green-emitting phosphor is shifted toward a higher $x$ and a lower $y$ coordinate value, reduced beam currents are required from the red and blue electron guns to achieve a white of the desired color temperature. Inasmuch as television applications conventionally require a specified total beam current, a reduction of current from the red and blue guns enables the green gun to furnish more beam current which results in a greater white brightness for the given total amount of beam current. This procedure effectively increases the brightness of the green phosphor component of the white field although the inherent efficiency of the phosphor remains substantially the same.

One example of a green-emitting component, found to be suitable for the improved tri-color combination, is a silver activated zinc sulfide-cadmium sulfide phosphor wherein the amount of cadmium sulfide is within the range of 40 to 42 percent by weight of the total host, with the amount of silver activator being in the range of substantially .0005 to .020 percent by weight. This phosphor has an inherent off-white or yellowish body color which is attributed to the presence of the cadmium sulfide in the material. It is known that the body color of the silver activated zinc sulfide-cadmium sulfide phosphors shifts toward the orange portion of the spectrum when the subject phosphor is subjected to high temperatures such as the 420 to 450° centigrade range encountered during cathode ray tube processing. It is also known that the hue of the luminance emission resulting from electron excitation of the phosphor will also shift toward the orange portion of the spectrum as a result of exposure to high temperature. There is also a loss in light output thought to be due to a decrease in phosphor efficiency resultant from the oxidation of zinc sulfide and cadmium sulfide which is also believed to increase the light absorption characteristics of the phosphor crystals in the blue spectral region due to the increased orange body color.

It has been found through experimentation, that by treating the completed pattern of the aforedescribed color screen prior to lacquering, with a 0.01 to 1.00 percent aqueous solution of potassium silicate, there will be a reduction in the degree of body color shift and hue shift of the silver activated green phosphor resultant from the high temperatures encountered in tube processing. Such reduction in the respective shifts results in a five to ten percent increase in the green and white field brightness levels. With reference to FIG. 4, the untreated silver activated zinc sulfide-cadmium sulfide phosphor component has a hue shift upon tube processing which is designated by G' and defined by $x$ and $y$ coordinates having substantially value of 0.325 and 0.605 respectively. The line K-G'-T' defines a dominant wavelength of substantially 554 m$\mu$ and a hue saturation of substantially 85 percent. By treating the completed screen with, for example, a 0.5 percent aqueous solution of potassium silicate, the silver activated zinc sulfide-cadmium sulfide evidences a reduction in hue shift as indicated by G which has $x$ and $y$ coordinates of substantially 0.313 and 0.590 respectively. The line K-G-T defines a dominant wavelength of substantially 552 m$\mu$. The hue saturation is substantially 75 percent which is less saturated than when the phosphor is untreated. Consequently, the treated green G requires less red R and blue B to effect the desired 9300° K. white K.

Another green-emitting component found to be suitable for inclusion in the subject phosphor combination is a zinc sulfide-cadmium sulfide host material co-activated with copper and aluminum. The amount of cadmium sulfide is within the range of substantially 5 to 10 percent by weight of the total host. The quantities of the included co-activator materials range from substantially 0.0005 to 0.030 percent by weight for the copper and from substantially 0.005 to 0.060 percent by weight for the aluminum. A specific example of this type of green-emitting phosphor material is one wherein the amount of cadmium sulfide is substantially 7 to 8 percent by weight of the total host, and wherein the quantities of co-activator materials range from substantially 0.010 to 0.025 percent by weight for the copper and from substantially 0.007 to 0.030 percent by weight for the aluminum. Because of the low percentage cadmium content this co-activated material is more white body than the previously described silver activated higher cadmium containing phosphor. In addition, this co-activated phosphor does not evidence a change in body color or a shift in hue as a result of tube processing temperatures. Therefore, the co-activated material is not treated with potassium silicate to maintain desired body color and hue. The $x$ and $y$ color coordinates are also noted at G in FIG. 4, being substantially 0.317 and 0.593 respectively. The line K-G-T defines a dominant wavelength of substantially 552 m$\mu$. The hue saturation is substantially 75 percent which substantially corresponds to the saturation of the treated silver activated green-emitting phosphor. Thus, it has been found that either of the described green-emitting materials requires approximately the same amounts of red R and blue B to effect the desired 9300° K. white K.

The green-emitting co-activated zinc sulfide-cadmium sulfide phosphor can be prepared, for example, by adding 8 percent cadmium sulfide to zinc sulfide together with 100 p.p.m. of copper and 300 p.p.m. of aluminum; the copper and aluminum co-activator being added as copper-zinc sulfide and aluminum-zinc sulfide respectively. The blend is then fired in a specific atmosphere to complete the synthesis. Suitable processes for synthesizing the above-noted co-activated green-emitting phosphor are the subject matter of separate patent applications, Ser. No. 8,041 and Ser. No. 7,977 now abandoned filed concurrently on Feb. 2, 1970.

The three color-emitting phosphor components of the improved combination are individually disposed as portions of the screen pattern in a similar manner. For example, a photographic printing technique may be employed for screen fabrication wherein a photosensitive material is utilized to bind the color-emitting phosphors to the tube viewing panel 15. In such a process, the panel is coated with a thin film of a photosensitive substance such as dichromate sensitized polyvinyl alcohol and one of the color-emitting phosphor materials. This coating application may be accomplished by first disposing a film of the photosensitive substance on the panel and depositing dry phosphor powder thereupon, or it may be by the application of a suspension of phosphor in the photosensitive substance as in the conventional slurry technique. The coated panel is then exposed to light substantially in the ultraviolet range through the aperture mask 31, which is inserted and suitably positioned within the panel, to cause the photosensitive substance to polymerize or harden and adhere to the surface of the panel according to the exposed dot pattern with the respective phosphor particles being retained therewith. Those portions of the screen which are not exposed to light, being hidden by the webbing of the mask, are subsequently removed by a developing step wherein the unexposed photosentive coating is dissolved by a suitable solvent such as water. This procedure is repeated for the deposition of each color-emitting phosphor pattern comprising the screen, the sequential order of color deposition not being critical. The plurality of dots comprising each of the related phosphor patterns are substantially compact and uniform structures having moderately rough surfaces with the phosphor particles well embedded therein.

When green-emitting silver activated zinc sulfide-cadmium sulfide phosphor is utilized in the screen combination, it has been found beneficial to apply thereon an aqueous solution of at least one oxygen containing compound from the group consisting essentially of sodium, potassium, lithium, and silicon. The above grouping is intended to include the alkali silicates and hydroxides. By way of illustration, an alkali silicate, such as potassium silicate, will be considered in this instance whereof a 0.01 to 1.00 percent aqueous solution of that alkali compound is applied over the patterned screen after the development of the third screen pattern in a manner that it will be retained through subsequent screen processing. An example of such a solution is one formulated on a molar basis wherein there is a mole ratio of 3.5 parts of silicon dioxide ($SiO_2$) to 1.0 part of potassium oxide ($K_2O$). It has been found that this application of potassium silicate reduces the shift of hue and the amount of phosphor body color change of the green-emitting silver activated zinc sulfide-cadmium sulfide phosphor resultant from heat encountered during panel sealing and tube process. There is also evidence, in some instances, that the presence of potassium silicate in the finished cathodoluminescent screen 27 improves the adherence of the subsequently applied aluminum film to the screen pattern and enhances the luminous brightness of all of the color-emitting phosphors comprising the screen combination. A suitable lacquer material is also applied to the finished screen to provide a substrate film having a substantially taut and smooth surface.

The application of the potassium silicate and the lacquer materials on the patterned screen can be accomplished in several ways, for example, the potassium silicate may be applied to the screen, with the screen being wet from pattern development or by rewetting. After application, the silicate coating is allowed to set and dry, after which the coated screen is uniformly moistened with an aqueous medium, such as water or a weak alcohol water solution to provide a proper surface for the subsequent application of lacquer. Care should be exercised in accomplishing the moistening step as a flow of the aqueous medium may inadvertently remove a portion of the protective potassium silicate coating. In another example, the potassium silicate is applied to the dry patterned screen as a constituent part of the screen moistening solution required to provide a proper surface for the application of the lacquer.

When the phosphor combination utilizes the co-activated zinc-cadmium sulfide green-emitting component, which does not shift hue or body color and therefore is not treated with potassium silicate, the patterned screen is moistened with an aqueous alcohol solution in preparation for lacquer application.

A film of a methacrylate, substantially free of plasticizing material, is then applied to the moistened screen to effect bridging of the phosphor dots and provide methacrylate substrate film having a substantially taut and smooth surface. The methacrylate lacquer has a viscosity within the range of 2.5 to 4.5 centistokes with methacrylate solids content ranging from 4.6 to 5.0 percent by weight dissolved in an organic system of solvents containing at least one of the group consisting essentially of toluene, xylene, methyl-isobutyl ketone, methyl-ethyl ketone and ethyl acetate.

The above procedure for applying the alkali silicate and lacquer materials is not to be considered limiting as the potassium silicate may also be applied as a constituent part of a conventional water base emulsion lacquer formulation, or it may be applied as a separate coating prior to an emulsion lacquering.

After the lacquer film has dried, a thin reflective metallic coating, such as aluminum, is then applied to the taut lacquer surface to provide a smooth and highly reflective backing for the color screen. The viewing panel with the aluminizing screen therein is then baked at a temperature in the range of substantially 420–440° centigrade for approximately a half hour to remove the organic photoresist and lacquer materials from the screen. The shadow mask 31 is again reinserted within the panel portion 15 for the final time, whereafter the mask-panel assembly is hermetically frit sealed to the funnel portion 17, along the seal line 16, by subjecting the panel and funnel portions to a sealing temperature of substantially 425–465° centigrade for about one hour. Positioning and sealing of the electron gun structure within the neck portion 19, followed by processing and sealing completes the basic processes of fabricating the tube.

The finished tube has therein an improved tri-color cathodoluminescent screen 27 as detailed in FIG. 3, which is formed of a repetitive dot pattern of red 43, green 45, and blue 47 color-emitting components of the aforedescribed combination of phosphors.

In those screens which are treated to contain a dissemination of potassium silicate 49, the greater concentration thereof is disposed between the dots of the pattern elements. In certain instances the presence of this potassium silicate coating in the finished screen structure has been found to improve adherence of the aluminum film thereto and to enhance luminous screen brightness. It is believed that the deposition of the potassium silicate coating 49 between the screen pattern and the tautly disposed metallic reflecting coating 51 functions to reduce light scattering from the compact dot structures thereby increasing the reflectance efficiency of the aluminum backing film.

A number of 25 inch 90 degree rectangular color cathode ray tubes (RE25AJP22) having face panels of substantially 69 percent transmission glass were constructed containing screens of the specifically aforedescribed tri-color phosphor combinations of the invention. A first embodiment had a taut aluminum reflectance film disposed over a screen wherein the green-emitting phosphor was silver activated zinc sulfide-cadmium sulfide treated with potassium silicate. A second embodiment utilized a taut aluminum reflectance film over a screen wherein the green-emitting component was copper-aluminum co-activated zinc sulfide-cadmium sulfide without potassium silicate treatment. Tubes of these respective embodiments were compared for hue and brightness characteristics with other tubes containing the improved phosphor combination without the potassium silicate coating and having a substantially pattern conforming aluminum reflectance film disposed thereover. A further comparison was made with commercially available standard tubes utilizing screens comprising: europium activated yttrium vanadate red, untreated silver activated zinc sulfide-cadmium sulfide green, and regular silver activated zinc sulfide blue having a substantially pattern conforming aluminum reflectance film disposed thereover. Values of relative brightness for the several types of screens were measured under similar conditions whereby the phosphors were individually and then simultaneously excited. With a potential of substantially 25 kv. applied to the screen, each color field was checked for brightness by having the respective electron gun supply a beam current of 500 micro-amperes. After these individual measurements were completed, the three guns were simultaneously operated with the respective beam intensities adjusted to a specified total, for example 800 m$\mu$, to provide a sufficient degree of brightness in each phosphor to produce a white of 9300° K. The unequal electron beam intensities necessary to produce the desired white were measured in microamperes and conventionally compared in gun ratios of R/G and R/B as previously described. The comparative measurements results indicating the improved hue and brightness attributes of the new phosphor system are clearly presented in Table I together with the beam current gun ratios required to obtain the 9300° K. white:

TABLE I

| | Total beam current (μa.) | New Phos. System (second embodiment). Improved RE oxide and sulfides (Cu-Al co-act. green), tri-dot screen without potassium silicate taut Al film | | | New Phos. System (first embodiment). Improved RE oxide and improved sulfides (Ag act. green), tri-dot screen with potassium silicate, taut Al film | | | Improved RE oxide and improved sulfides (Ag act. green), tri-dot screen without potassium silicate, pattern conforming Al film | | | Standard Phos. System. Regular RE vanadate and regular sulfides, tri-dot screen without potassium silicate, pattern conforming Al film | | |
|---|---|---|---|---|---|---|---|---|---|---|---|---|---|
| | | Brightness (ft.-l.) | Color coord. $x$ | $k$ | Brightness (ft.-l.) | Color coord. $x$ | $k$ | Brightness (ft.-l.) | Color coord. $x$ | $k$ | Brightness (ft.-l.) | Color coord. $x$ | $k$ |
| Field color: | | | | | | | | | | | | | |
| Red | 500 | 11.8 | 0.641 | 0.334 | 11.8 | 0.644 | 0.330 | 10.4 | 0.641 | 0.329 | 7.9 | 0.644 | 0.329 |
| Green | 500 | 49.7 | 0.317 | 0.593 | 43.4 | 0.313 | 0.589 | 37.6 | 0.325 | 0.605 | 37.9 | 0.307 | 0.614 |
| Blue | 500 | 9.3 | 0.150 | 0.068 | 9.3 | 0.152 | 0.068 | 8.4 | 0.153 | 0.067 | 6.7 | 0.151 | 0.061 |
| White (9,300° K.) | 800 | 42.2 | | | 38.8 | | | 34.5 | | | 30.4 | | |

| | | Beam current ratio for 9,300° K. white | Beam current ratio for 9,300° K. white | Beam current ratio for 9,300° K. white | Beam current ratio for 9,300° K. white |
|---|---|---|---|---|---|
| Beam ratios: | | | | | |
| R/G | (800) | .78 | .77 | .66 | .93 |
| R/B | (800) | 1.14 | 1.21 | 1.09 | 1.35 |

Figure 5:
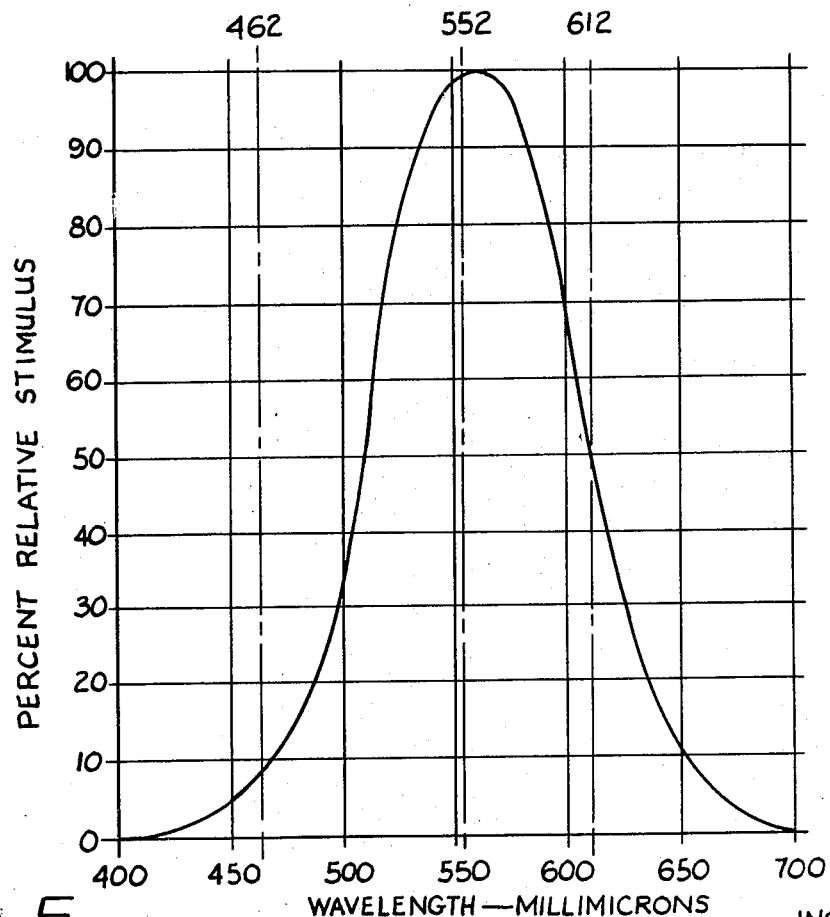
FIG. 5 is a standard visibility curve whereon the dominant wavelengths of the new screening combination are shown.

With reference to FIG. 5, dominant wavelengths of the three phosphor components of the new phosphor combinations are shown in relation to a standard visibility curve. It is evident that green emission plays a prominent role in white brightness, since the wavelengths of the green portion of the spectrum lie within the peak of the curve, but green alone does not significantly increase the white brightness level. A major improvement in white brightness can only be achieved by increasing the brightness of all three cooperating phosphors or by a combination of phosphor efficiency increase in one or more phosphors combined with a change in chromaticity of other of the phosphors to effectively increase the eye response characteristics of the resultant white field.

Figure 6:
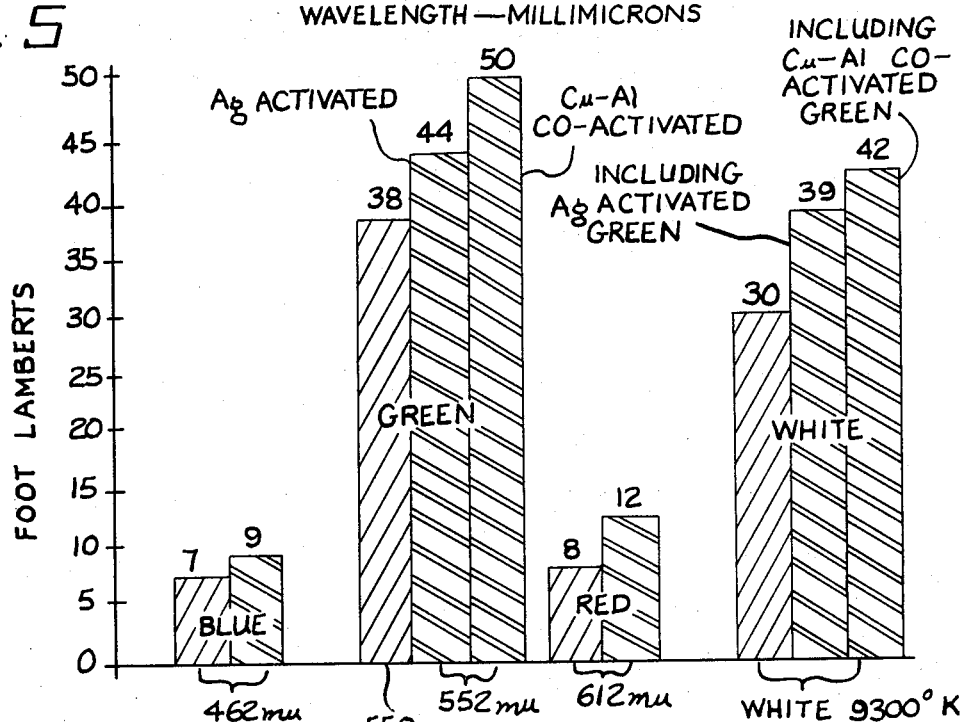
FIG. 6 is a graphic presentation illustrating the enhanced brightness of the new screening system.

In FIG. 6, the brightness of the new and improved phosphor system is graphically compared with that of the standard system.

To further illustrate the influence of the brighter red, green, and blue-emitting phosphors on the improved white brightness, a comparison is made of the respective gun currents comprising the 800 microamperes of total beam current used to produce the white of 9300° K.

Standard screen system

Red Gun$_{μa.}$+Green Gun$_{μa.}$+Blue Gun$_{μa.}$=800$_{μa.}$ total

Gun ratios:
$R/G=0.93$; $G=R/0.93$
$R/B=1.35$; $B=R/1.35$ $$R+R/.93+R/1.35=800$$

|  | μa. |
|---|---|
| Red Gun (36%) | 285 |
| Green Gun (38%) | 305 |
| Blue Gun (26%) | 210 |

Total for 9300° K. white brightness of 30.4 ft. l. _____ 800

Improved screen system: (First embodiment) including Ag activated and treated green. Taut aluminizing film Gun ratios:
$R/G=0.77$; $G=R/0.77$
$R/B=1.21$; $B=R/1.21$ $$R+R/0.77+R/1.21=800$$

|  | μa. |
|---|---|
| Red Gun (32%) | 256 |
| Green Gun (42%) | 333 |
| Blue Gun (26%) | 211 |

Total for 9300° K. white brightness of 38.8 ft. l. _____ 800

Improved screen system: (Second embodiment) including Cu-Al co-activated green. Taut aluminizing film Gun ratios:
$R/G=0.78$; $G=R/0.78$
$R/B=1.14$; $B=R/1.44$ $$R+R/0.78+R/1.14=800$$

|  | μa. |
|---|---|
| Red Gun (32%) | 254 |
| Green Gun (40%) | 323 |
| Blue Gun (28%) | 223 |

Total for 9300° K. white brightness of 42.2 ft. l. _____ 800

The individual beam currents supplied by the respective red, green, and blue guns are components of the total 800 μa. beam current, the magnitude of each current being determined by the efficiency of the respective phosphor.

For example, with reference to the first embodiment noted above, excitation of the improved red-emitting oxide phosphor, to provide improved white brightness of the desired temperature requires substantially 256 μa. of red gun beam current as compared to substantially 285 μa. in the standard system. The improved blue-emitting phosphor provides increased brightness at approximately the same beam current. Use of the improved red and blue-emitting materials allows 28 additional μa. of beam current to be directed to additionally exciting the silver activated green-emitting phosphor which results in improved brightness from that component. Therefore, in the first embodiment of the improved screen system, approximately 42 percent of the combined beam currents required to produce a bright white of substantially 9300° K. is supplied by the green electron gun.

In referring to the second screen embodiment, use of the improved red and blue-emitting materials likewise requires less of the total beam current than employed in the standard system. Since the co-activated green-emitting phosphor in this embodiment is inherently more efficient than the silver activated green-emitting material in the first embodiment, less beam current is required from the green gun in the second embodiment than is required in the first embodiment. This difference in the efficiencies of the respective green-emitting phosphors is compensated for in the second embodiment by increasing the blue gun current to effect the proper color balance.

Thus, there are provided markedly improved cathodoluminescent screen embodiments for a color cathode ray tube wherein the carefully selected new combinations of phosphors comprise brighter red and blue-emitting materials in conjunction with specific green-emitting phosphors having substantially stabilized chromaticity coordinates. In one embodiment, the screen is treated to enhance the brightness characteristics of the new screen combination.

While there have been shown and described what are at present considered the preferred embodiments of the invention, it will be obvious to those skilled in the art that various changes and modifications may be made therein without departing from the scope of the invention as defined by the appended claims.

What is claimed is:

1. The method of forming a tri-color-emitting cathodoluminescent screen on the panel portion of a shadow mask cathode ray tube utilizing a combination of color-emitting phosphors to form a screen pattern of multitudinous dots utilizing a red-emitting phosphor, a green-emitting silver activated zinc sulfide-cadmium sulfide phosphor and a blue-emitting phosphor, said respective phosphor dot patterns being formed in a desired sequency by coating said panel with photosensitized resist material and a respective phosphor, discretely photo-exposing the same through a positioned aperture mask and subsequently developing said photo-exposed pattern, said photo deposition procedure being substantially repeated two additional times to provide a patterned screen wherein the respective dots are substantially compact and uniform structures having moderately rough surfaces, said method comprising:

applying a 0.01–1.0 percent aqueous solution of at least one oxygen containing compound selected from the group consisting essentially of sodium, potassium, lithium, and silicon to said patterned screen after the development of said third screen pattern to reduce the shift of hue and amount of phosphor body color change of said green-emitting phosphor during tube processing, said screen being wet at the time of said compound application; drying said compound coated screen;

uniformly moistening said coated screen with an aqueous medium;

applying a methacrylate lacquer film of a viscosity to effect bridging of the phosphor dots and provide a substrate film having a substantially taut and smooth surface;

drying said lacquer film;

applying a reflective metallic coating to said taut lacquer surface to provide a smooth and highly reflective backing for said screen; and baking said coated screen to decompose and remove said photo-resist material and said lacquer substrate film thereby leaving said metallic reflective coating in substantially bridged positioning on said phosphor dots.

2. The improved method of forming a tri-color emitting cathodoluminescent screen according to claim 1 wherein the oxygen containing compounds includes alkali silicates and hydroxides of the elements stated.

3. The improved method of forming a tri-color emitting cathodoluminescent screen according to claim 1 wherein the oxygen containing compound applied to the patterned screen is a mole ratio of 3.5 parts of silicon dioxide to 1.0 part of potassium oxide; and wherein said methacrylate lacquer composition is substantially free of plasticizing material and has an application viscosity of substantially 2.5 to 4.5 centistokes.

References Cited

UNITED STATES PATENTS

| | | | |
|---|---|---|---|
| 3,243,625 | 7/1966 | Levine et al. | 313—92 |
| 3,497,749 | 4/1970 | Busney | 313—92 |
| 3,428,454 | 2/1969 | Angelucci | 96—36.1 |
| 3,481,733 | 12/1969 | Evans | 96—36.1 |

NORMAN G. TORCHIN, Primary Examiner

E. C. KIMLIN, Assistant Examiner

PO-1050
(5/69)

UNITED STATES PATENT OFFICE
CERTIFICATE OF CORRECTION

Patent No. 3,689,265          Dated  September 5, 1972

Inventor(s)  Lyle W. Evans and Walter W. Slobbe

It is certified that error appears in the above-identified patent and that said Letters Patent are hereby corrected as shown below:

Columns 11 and 12, Table I, column headings "Color Coord.

$x \quad k$ "

should read  --- Color Coord.

$x \quad y$  ---.

Column 12, Line 28, "R/B=1.14; B=R/1.44" should read

--- R/B=1.14; B=R/1.14 ---

Signed and sealed this 23rd day of January 1973.

(SEAL)
Attest:

EDWARD M. FLETCHER, JR.                ROBERT GOTTSCHALK
Attesting Officer                      Commissioner of Patents

UNITED STATES PATENT OFFICE
CERTIFICATE OF CORRECTION

Patent No. 3,689,265　　　Dated September 5, 1972

Inventor(s) Lyle W. Evans and Walter W. Slobbe

It is certified that error appears in the above-identified patent and that said Letters Patent are hereby corrected as shown below:

Column 1, Line 34: "now abandoned" should be deleted.

Signed and sealed this 6th day of August 1974.

(SEAL)
Attest:

McCOY M. GIBSON, JR.　　　C. MARSHALL DANN
Attesting Officer　　　　　Commissioner of Patents